(12) United States Patent
Toyoda et al.

(10) Patent No.: US 10,336,494 B2
(45) Date of Patent: Jul. 2, 2019

(54) COMPOSITE CONTAINER

(71) Applicant: DISCMA AG, Hunenberg (CH)

(72) Inventors: Tamotsu Toyoda, Kanagawa (JP); Shinichi Tabata, Kanagawa (JP); Mitsuru Shiokawa, Kanagawa (JP)

(73) Assignee: Discma AG, Zürich (CH)

( * ) Notice: Subject to any disclaimer, the term of this patent is extended or adjusted under 35 U.S.C. 154(b) by 67 days.

(21) Appl. No.: 15/500,763

(22) PCT Filed: Jul. 9, 2015

(86) PCT No.: PCT/JP2015/003475
§ 371 (c)(1),
(2) Date: Jan. 31, 2017

(87) PCT Pub. No.: WO2016/017082
PCT Pub. Date: Feb. 4, 2016

(65) Prior Publication Data
US 2017/0217624 A1    Aug. 3, 2017

(30) Foreign Application Priority Data

Jul. 31, 2014  (JP) ................................ 2014-156919
Oct. 31, 2014  (JP) ................................ 2014-223680

(51) Int. Cl.
| B65D 85/00 | (2006.01) |
| B65D 1/02 | (2006.01) |
| B29C 49/24 | (2006.01) |
| B65D 23/08 | (2006.01) |

(Continued)

(52) U.S. Cl.
CPC ............ B65D 1/0207 (2013.01); B29C 49/08 (2013.01); B29C 49/24 (2013.01); B29C 49/46 (2013.01);
(Continued)

(58) Field of Classification Search
CPC ...... B65D 1/0207; B65D 1/023; B65D 23/08; B65D 25/205; B29C 49/08; B29C 49/24; B29C 49/46; B29C 2049/2422
(Continued)

(56) References Cited

U.S. PATENT DOCUMENTS 5,193,711 A *  3/1993  Hirata ................... B29C 45/14
                                                220/62.11
8,968,636 B2 *  3/2015  Eberle .................. B29C 49/14
                                                264/523

(Continued)

FOREIGN PATENT DOCUMENTS

| JP | H06-64029 A | 3/1994 |
| JP | H08-58796 A | 3/1996 |

(Continued)

*Primary Examiner* — Rafael A Ortiz
(74) *Attorney, Agent, or Firm* — Eric J. Sosenko; Jonathan P. O'Brien; Honigman LLP

(57) ABSTRACT

A composite container having a paper label adhered without adhesives to a container body at at least one of the top end edge outer circumferential surface of the container body and the bottom end edge outer circumferential surface of the base part of the container body. Adherence of the paper label to the container body being effectuated by disposing the paper label in a mold and biaxial stretch blow shaping a preform into the container body with a liquid as a pressurized medium.

2 Claims, 3 Drawing Sheets

(51) Int. Cl.
  *B29C 49/08* (2006.01)
  *B29C 49/46* (2006.01)
  *B65D 25/20* (2006.01)
  *B29K 23/00* (2006.01)
  *B29K 105/00* (2006.01)
  *B29L 31/00* (2006.01)

(52) U.S. Cl.
  CPC ............ *B65D 1/023* (2013.01); *B65D 23/08* (2013.01); *B65D 23/0864* (2013.01); *B65D 25/205* (2013.01); *B29C 2049/2422* (2013.01); *B29C 2049/2495* (2013.01); *B29C 2049/4655* (2013.01); *B29K 2023/12* (2013.01); *B29K 2105/258* (2013.01); *B29L 2031/7158* (2013.01)

(58) Field of Classification Search
  USPC ...... 206/459.5, 487, 489, 1.5; 425/503, 522; 220/592.16; 40/628, 651, 631, 664
  See application file for complete search history.

(56) References Cited

U.S. PATENT DOCUMENTS

| | | | |
|---|---|---|---|
| 2006/0191174 A1* | 8/2006 | Graham | B29C 45/14 40/306 |
| 2008/0301991 A1* | 12/2008 | Richards | B65D 25/36 40/637 |
| 2011/0260369 A1 | 10/2011 | Klofta et al. | |
| 2013/0140264 A1* | 6/2013 | Hanan | B65D 23/00 215/384 |

FOREIGN PATENT DOCUMENTS

| | | |
|---|---|---|
| JP | 3750844 A | 11/2000 |
| JP | 2013-248748 A | 12/2013 |
| WO | 2003/086883 A1 | 10/2003 |
| WO | 2008-018546 A1 | 2/2008 |
| WO | 2014/001099 A1 | 1/2014 |

* cited by examiner

COMPOSITE CONTAINER

TECHNICAL FIELD

The present invention relates to a composite container combining a synthetic resin container body and a paper label, and more particularly is one wherein the manufacturing process is simplified and, at the same time, the paper label is adhered to the container body.

BACKGROUND ART

Conventionally, composite containers combining a synthetic resin container body and a paper label such as, for example, that which is disclosed in Japanese Patent No. 3750844 are known.

SUMMARY OF THE INVENTION

A conventional composite container, such as that described above, is made by being covered by a paper label created separately as a paper tube after the container body is shaped. Since separate processes are required for forming the container and adding the label, cost reduction is limited.

Furthermore, a composite container of this sort is formed with a protrusion on the outer circumferential surface of the base of the container body to prevent the paper tube from coming off of the container body. While the paper tube is held on the base by the protrusion, in order to more securely prevent it from coming off, it is necessary to separately provide a process for adhering the paper tube to the container body.

Because the present invention is one developed in view of the aforementioned present situation, one of its objects is to provide a composite container wherein the manufacturing process is simplified and, at the same time, the paper label is adhered to the container body.

That is, the overall configuration of the present invention is as follows.

A composite container combines a synthetic resin container body and a paper label, wherein the container body forms a bottle shape made by forming a mouth part on the top end edge of a tube-shaped base part rising up from the outer circumferential edge of a bottom part via a shoulder part constricting in radius upwards; and the composite container is formed by the paper label being adhered to at least one of the top end edge outer circumferential surface and the bottom end edge outer circumferential surface of the base part of the container body by disposing the paper label in a mold, and biaxial stretch blow shaping a preform with a liquid as a pressurized medium.

Here in the present specification, "adhere" includes both pseudo adhesion in which the label is adhered so as to be able to be peeled off, and adhesion that cannot be peeled off.

The paper label forms a paper tube.

It is noted that in the present specification, "paper tube" includes not only one with an O-shaped cross-section, but also one with a C-shaped cross-section. That is, in one embodiment, the paper tube may be a rectangular piece of paper that is curled up and disposed with an interval between one end edge and the other end edge in the circumferential direction.

The composite container combines a synthetic resin container body and a paper tube, wherein the container body forms a bottle shape made by forming a mouth part on the top end edge of a tube-shaped base part rising up from the outer circumferential edge of a bottom part via a shoulder part constricting in radius upwards.

The paper tube is attached to the outer circumferential surface spanning from the top end edge to the bottom end edge of the base part of the container body, and the composite container is formed by at least the top end edge inner circumferential surface and the bottom end edge inner circumferential surface of the paper label being adhered to the outer circumferential surface of the base part of the container body by disposing the paper label in a mold, and biaxial stretch blow shaping a preform with a liquid as a pressurized medium.

The paper tube may be formed by curling up a rectangular piece of paper, and inserting at least one protrusion formed on one end edge in the circumferential direction into at least one slit formed on the other end edge in the circumferential direction.

According to the present invention, since the composite container is formed by disposing a paper label in a mold and biaxial stretch blow shaping a preform, it is not necessary to separately provide a process for attaching a paper label after biaxial stretch blow shaping. Furthermore, since the paper label is adhered to at least one of the top end edge outer circumferential surface or bottom end edge outer circumferential surface of the base part of the container body by a biaxial stretch blow shaping using a liquid as a pressurized medium, it is not necessary to separately provide a process for adhering the paper label to the container body or an adhesive layer (adhesive).

Therefore, according to the present invention, a composite container can be provided wherein the manufacturing process is simplified and, at the same time, the paper label is adhered to the container body.

DETAILED DESCRIPTION OF THE INVENTION

Below, a composite container according to one embodiment of the present invention will be described with an example in detail with reference to FIG. 1. Note that in the present specification, "top" is the side where the mouth part 24 is located relative to the bottom part 21 of the composite container 1, and "bottom" is its opposite side.

Figure 1:
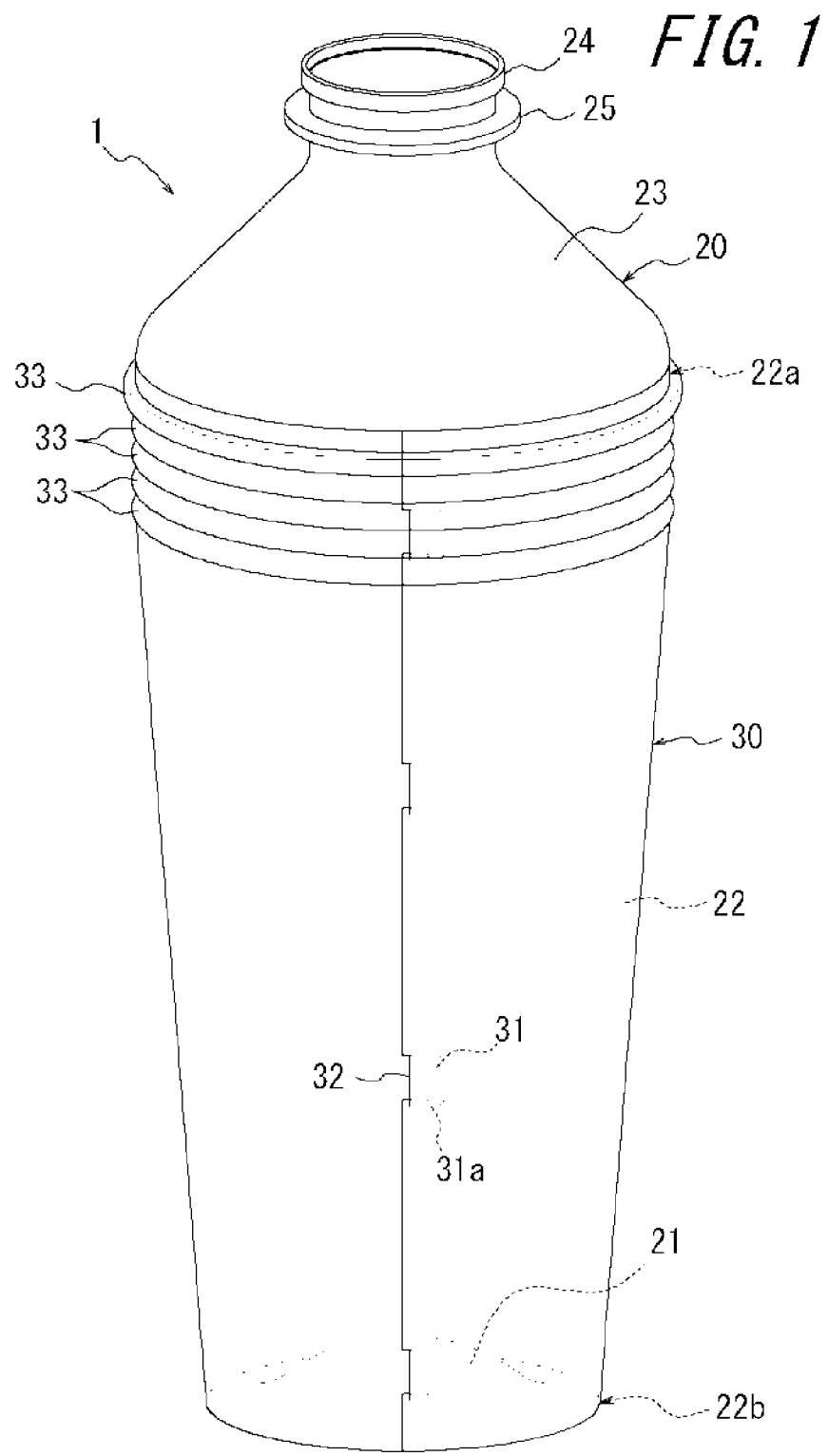
FIG. 1 is a perspective view illustrating a composite container according to one embodiment of the present invention.

As illustrated in FIG. 1, a composite container 1 according to the present embodiment is configured by a synthetic resin container body 20 and a paper tube 30 formed by a paper label. The container body 20 forms a bottle shape made by forming a cylindrical mouth part 24 on the top end edge of a cylindrical base part 22 rising up from the outer circumferential edge of a bottom part 21 forming a disc shape with the center thereof raised, via a shoulder part 23 constricting in radius upwards. Note that in the present embodiment, the base part 22 forms a tapered shape expanding slightly in radius upwards. The mouth part 24 has a cylindrical neck ring 25 formed thereon.

The paper tube 30 is attached to the outer circumferential surface spanning from the top end edge 22a to the bottom end edge 22b of the base part 22 of the container body 20. The inside surface of the paper tube 30 (the surface contacting the container body) does not have an adhesive layer provided thereon, and is formed by curling up a rectangular piece of paper, and inserting at least one protrusion 31 formed on one end edge part in the circumferential direction (projecting from the edge part) into at least one slit 32 formed on the other end edge part in the circumferential direction (provided in a position offset to the inside from the edge part). At this time, one end edge part and the other end edge part are overlapped with a predetermined breadth. Note that in the present embodiment, four protrusions 31 and four slits 32 are each disposed with an interval therebetween, along the vertical direction or the like. Each protrusion 31 has a stop part 31a for preventing it from coming out from the slit 32. Also, when biaxial stretch blow shaped, each of the protrusions 31 is movable in a circumferential direction within the corresponding slit 32.

Further, since the composite container 1 has the paper tube 30 disposed in a mold, and the preform is biaxial stretch blow shaped with a liquid as a pressurized medium, it is formed by at least the top end edge inner circumferential surface and the bottom end edge inner circumferential surface of the paper tube 30 being adhered to the outer circumferential surface of the base part 22 of the container body 20. When the paper tube 30 is disposed in the mold, first the piece of paper configuring the paper tube 30 (the paper label) is curled up, each protrusion 31 is inserted into the corresponding slit 32, making the paper tube 30 that forms a tube shape such as that illustrated, disposing the paper tube 30 inside the mold. The mold can be, for example, configured by a top mold configured by a plurality of divided molds, and a singular bottom mold. In this case, the paper tube 30 is disposed inside the mold and is shaped by injection molding, and by disposing a preform maintained at a temperature appropriate to the blow shaping and closing the mold, the preform can be biaxial stretch blow shaped.

The preform has a neck ring on the top part of the body part, which forms a test tube shape. When it is biaxial stretch blow shaped, a stretching rod is inserted from the mouth part of the body part of the preform, and by stretching the bottom of the body part downwards and filling with a liquid as a pressurized medium from the mouth part of the body part, the circumferential wall part of the body part can be made to stretch outwards in a radial direction. Note that a stretching rod is not necessarily always used when biaxial stretch blow shaping; for example, by filling with a liquid as a pressurized medium from the mouth part of the body part of the preform, the bottom part of the main body may be stretched downward and the circumferential wall part of the main body may be stretched outwards in a radial direction. Furthermore, a liquid that will become the contents of the composite container 1 is preferably used as the liquid used as a pressurized medium, and by so doing, the need to separately provide a filling process for the contents is dispensed with, and the manufacturing process can be made simpler. Also, in the mold, the position corresponding to the top end edge outer circumferential surface of the paper tube 30 is formed with a plurality of grooves extending in a circumferential direction, and as a result of the biaxial stretch blow shaping, the paper tube 30 and the container body 20 have formed a plurality of ridges 33 corresponding to the grooves.

According to the present embodiment, since the composite container 1 is formed by disposing a paper tube 30 in a mold and biaxial stretch blow shaping a preform, it is not necessary to provide a process for attaching the paper tube 30 separately after biaxial stretch blow shaping. Furthermore, since at least the top end edge inner circumferential surface and the bottom end edge inner circumferential surface of the paper tube 30 are adhered to the outer circumferential surface of the base part 22 of the container body 20 by biaxial stretch blow shaping with a liquid as a pressurized medium, it is not necessary to separately provide a process for adhering the paper tube 30 to the container body 20.

Also, the paper tube 30 is formed by curling up a rectangular piece of paper and inserting at least one protrusion 31 formed on one end edge in the circumferential direction into at least one slit 32 formed on the other end edge in the circumferential direction, and the overlapping region between the one end edge part and the other end edge part is at least partially adhered to the outer circumferential surface of the base part 22 of the container body 20.

Further, when biaxial stretch blow shaping, by each protrusion 31 being movable in the circumferential direction within the corresponding slit 32, the paper tube 30 expands radially and deforms following the expanding radial deformation of the preform forming the base part 22 of the container body 20, making it possible to stably realize the circumferential length required when shaping is complete. Thus, the occurrence of damage to the paper tube 30 when biaxial stretch blow shaping can be effectively prevented.

Also, since the degree of dilution of the container body 20 can be improved by using a liquid as a pressurized medium for the biaxial stretch blow shaping, bumps and indentations corresponding to the protrusions 31 inserted into the slits 32 and unevenness (bumps and indentations) in the overlapping parts of the piece of paper can be formed in the outer circumferential surface of the base part 22 of the container body 20, making possible fixing of the position of the paper tube 30 by the bumps and indentations as well.

As described above, in the composite container 1 according to the present embodiment, by biaxial stretch blow shaping using a liquid as a pressurized medium, the top end edge inner circumferential surface and bottom end edge inner circumferential surface of the paper tube 30 made from a paper label are adhered to the outer circumferential surface of the base part 22 of the container body 20, and the overlapping region of the paper tube 30 is at least partially adhered to the outer circumferential surface of the base part 22 of the container body 20. However, the conditions for causing adhesion to occur in this fashion by biaxial stretch blow shaping using a liquid as a pressurized medium are not limited to the form and disposition range of the paper label as described above.

That is, for example, in a case where the paper tube 30 is attached to the outer circumferential surface spanning the middle part in the vertical direction on the base part 22 from the top end edge on the base part 22, it is confirmed that the top edge part inner circumferential surface of the paper tube 30 made from a paper label is adhered to the outer circumferential surface of the base part 22 of the container body 20, and that the overlapping region of the paper tube 30 is at least partially adhered to the outer circumferential surface of the base part 22 of the container body 20 by biaxial stretch blow shaping using a liquid as a pressurized medium. Also, at this time, adhesion does not occur on the bottom end edge inner circumferential surface of the paper tube 30. Thus, since adhesion by biaxial stretch blow shaping using a liquid as a pressurized medium as described above occurs in parts corresponding to unevenness (bumps and indentations) in the top end edge, bottom end edge, and overlapping region of the paper tube 30 of the base part 22 of the container 20, it can be inferred that the adhesion described above occurs at inflected parts (parts where the curvature changes) of resin of this sort.

Note that the points described above only illustrate one embodiment of the present invention, and that various modifications can be added within the scope of the patent claims. For example, the paper label was described as one forming a paper tube 30, but the shape of the paper label is not particularly limited; for example, it may have a half arc shaped cross section. Also, the paper label (paper tube 30) was described as one provided in a range spanning from the top end edge to the bottom end edge of the base part 22 of the container body 20, but the disposition of the paper label is not limited to a range of this sort; by disposing the paper label inside the mold and biaxial stretch blow shaping a preform with a liquid as a pressurized medium, the paper label may be adhered to at least one of the top end edge outer circumferential surface and bottom end edge outer circumferential surface of the base part 22 of the container body 20. That is, the paper label may be disposed so as to be superimposed with at least one of the top end edge outer circumferential surface and bottom end edge outer circumferential surface of the base part 22 of the container body 20.

Working Example 1

As working example 1 for the present invention, the composite container 1 illustrated in FIG. 1 was manufactured. In particular, it was manufactured using polypropylene (PP) as the material for the container body 20, disposing the paper tube 30 inside a mold, and biaxial stretch blow shaping a preform with water as a pressurized medium. The paper tube 30 of the composite container 1 manufactured in this manner was severed in the vertical direction spanning the vertical breadth of the paper tube 30, and the condition of adhesion between the inner circumferential surface of the paper tube 30 and the outer circumferential surface of the container body 20 was observed.

Figure 2:
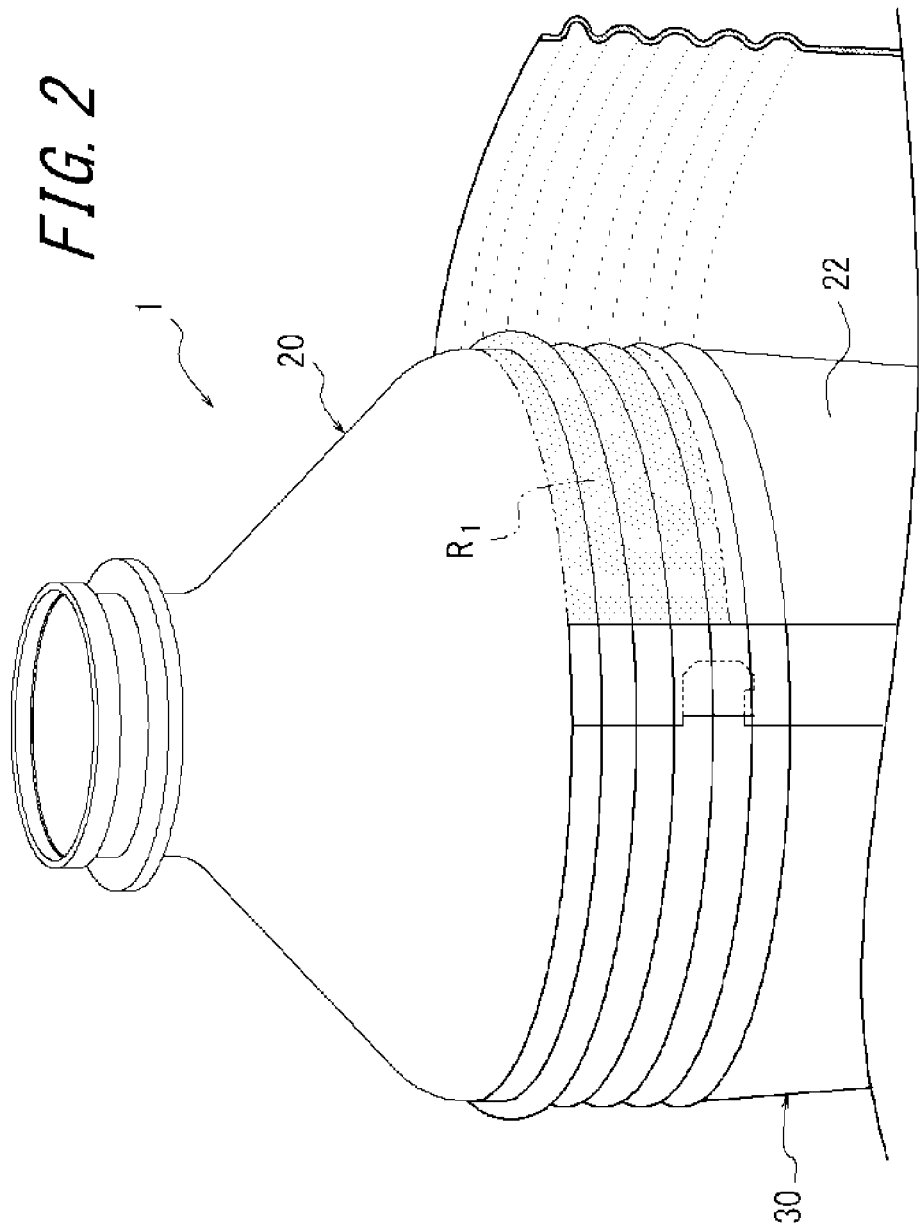
FIG. 2 is a perspective view illustrating the condition of adhesion that occurred in a working example of the present invention, illustrating the condition on the top end edge inner circumferential surface of the paper tube.
Figure 3:
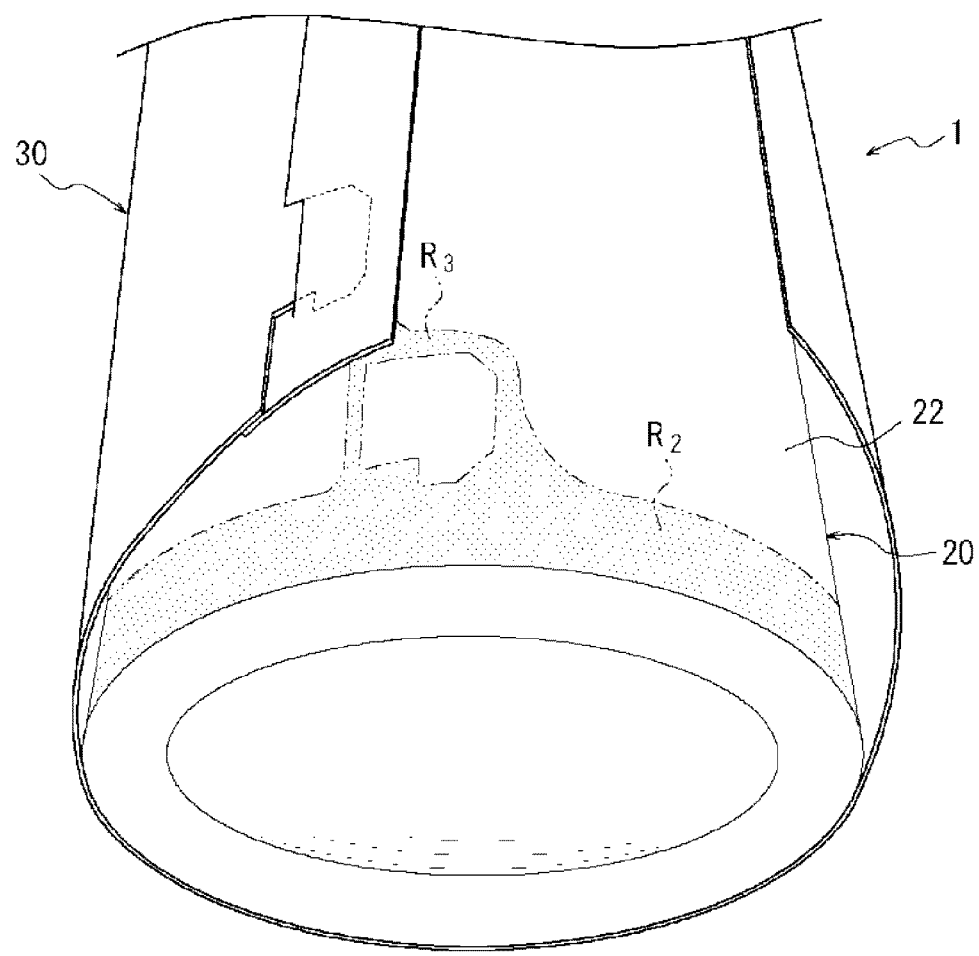
FIG. 3 is a perspective view illustrating the condition of adhesion that occurred in a working example of the present invention, illustrating the condition on the bottom end edge inner circumferential surface of the paper tube.

The above condition is illustrated in FIG. 2 and FIG. 3. In FIG. 2, on the base part 22, a part $R_1$ with the top end edge inner circumferential surface of the paper tube 30 peeled off is illustrated with hatching. Further, in FIG. 3, on the base part 22, a part $R_2$ with the bottom end edge inner circumferential surface of the paper tube 30 peeled off and a part $R_3$ with the previously described overlapping region peeled off from the base part surface are illustrated with hatching. These peeled off parts were all observed to have changed color and become white. Because of this, it can be inferred that in these parts, by resin material stretched during biaxial stretch blow shaping using a liquid as a pressurized medium entering into fine bumps and indentations on the surface of the paper tube 30, fine bumps and indentations are formed on the resin material surface, causing adhesion to occur, causing paper dust to remain on the resin material surface when peeling off the paper tube 30.

Thus, it was confirmed that the top end edge inner circumferential surface, bottom end edge inner circumferential surface, and aforementioned overlapping region of the paper tube 30 are adhered to the outer circumferential surface of the base part 22 of the container 20.

Working Examples 2-12 and Comparative Examples 1-13

Also, as working examples 2-12 and comparative examples 1-13 for the present invention, the composite container 1 illustrated in FIG. 1 was manufactured under the conditions illustrated in Table 1. Polypropylene was used as the material for the container body 20. Further, the thickness of the manila paper used as the material for the paper label was 0.36 mm, the thickness of the coated paper was 0.10 mm, and the thickness of the copy paper was 0.09 mm. The temperature of the liquid (water) used as a pressurized medium for the biaxial stretch blow shaping was 20° C. Also, as illustrated in Table 1, the peak pressure of the pressurized medium (maximum pressure during the blow shaping process), the rate of pressure increase of the pressurized medium (time until the peak pressure is reached from the beginning of the blow shaping), the preform temperature, and the temperature of the mold were varied, and adhesiveness was confirmed. Note that those in which adhesion occurred are illustrated as working examples 2-12, and those in which adhesion did not occur are illustrated as comparative examples 1-13.

TABLE 1

|  | PF Temp (° C.) | Peak Pressure (MPa) | Pressurizing Time (Sec) | Mold Temp (° C.) | Paper Label | Adhesiveness |
| --- | --- | --- | --- | --- | --- | --- |
| Comparative Example 1 | 120 | 2.1 | 0.2 | 40 | Manila Paper | Adhesion did not occur. |
| Working Example 2 | 120 | 3.0 | 0.2 | 40 | Manila Paper | Paper label slightly adhered and was not able to be peeled in a part of the overlapping region of the paper tube and the base part bottom end edge. |
| Working Example 3 | 120 | 3.8 | 0.2 | 40 | Manila Paper | Paper label strongly adhered and was not able to be peeled in the overlapping region of the paper tube and the base part bottom end edge. |
| Comparative Example 2 | 120 | 3.8 | 0.4 | 40 | Manila Paper | Adhesion did not occur. |
| Comparative Example 3 | 130 | 2.1 | 0.2 | 40 | Manila Paper | Adhesion did not occur. |
| Working Example 4 | 125 | 3.8 | 0.2 | 40 | Manila Paper | Paper label strongly adhered and was not able to be peeled in the overlapping region of the paper tube, base part bottom end edge and base part top end edge. |

TABLE 1-continued

| | PF Temp (° C.) | Peak Pressure (MPa) | Pressurizing Time (Sec) | Mold Temp (° C.) | Paper Label | Adhesiveness |
|---|---|---|---|---|---|---|
| Working Example 5 | 130 | 3.8 | 0.2 | 40 | Manila Paper | Paper label strongly adhered and was not able to be peeled in the overlapping region of the paper tube, base part bottom end edge and base part top end edge. |
| Comparative Example 4 | 130 | 2.1 | 0.2 | 80 | Manila Paper | Adhesion did not occur. |
| Comparative Example 5 | 120 | 2.1 | 0.2 | 40 | Copy Paper | Adhesion did not occur. |
| Working Example 6 | 120 | 3.0 | 0.2 | 40 | Copy Paper | Paper label strongly adhered and was not able to be peeled a part of the overlapping region of the paper tube and a part of the base part top end edge. |
| Working Example 7 | 120 | 3.8 | 0.2 | 40 | Copy Paper | Paper label strongly adhered and was not able to be peeled in the overlapping region of the paper tube, base part bottom end edge and base part top end edge. |
| Comparative Example 6 | 120 | 3.8 | 0.4 | 40 | Copy Paper | Adhesion did not occur. |
| Working Example 8 | 130 | 2.1 | 0.2 | 40 | Copy Paper | Had pseudo adhesion and was able to be peeled. |
| Working Example 9 | 125 | 3.8 | 0.2 | 40 | Copy Paper | Paper label strongly adhered and was not able to be peeled in the overlapping region of the paper tube, base part bottom end edge and base part top end edge. |
| Working Example 10 | 130 | 3.8 | 0.2 | 40 | Copy Paper | Paper label strongly adhered and was not able to be peeled in the overlapping region of the paper tube, base part bottom end edge and base part top end edge. |
| Comparative Example 7 | 130 | 2.1 | 0.2 | 80 | Copy Paper | Adhesion did not occur. |
| Comparative Example 8 | 120 | 2.1 | 0.2 | 40 | Coated Paper | Adhesion did not occur. |
| Comparative Example 9 | 120 | 3.0 | 0.2 | 40 | Coated Paper | Adhesion did not occur. |
| Comparative Example 10 | 120 | 3.8 | 0.2 | 40 | Coated Paper | Adhesion did not occur. |
| Comparative Example 11 | 120 | 3.8 | 0.4 | 40 | Coated Paper | Adhesion did not occur. |
| Comparative Example 12 | 130 | 2.1 | 0.2 | 40 | Coated Paper | Adhesion did not occur. |
| Working Example 11 | 125 | 3.8 | 0.2 | 40 | Coated Paper | Had pseudo adhesion and was able to be peeled. |
| Working Example 12 | 130 | 3.8 | 0.2 | 40 | Coated Paper | Had pseudo adhesion and was able to be peeled. |
| Comparative Example 13 | 130 | 2.1 | 0.2 | 80 | Coated Paper | Adhesion did not occur. |

Upon referencing comparative examples 1-4 and working examples 2-5, which used manila paper as the paper label, as well as comparative examples 5-7 and working examples 6-10, which used copy paper, it can be understood that a rise in the peak pressure and a rise in the rate of pressure increase (reduction in the pressurizing time) contribute remarkably to improvement of adhesiveness. Further, it can be understood that a rise in the preform temperature (PF temperature) also contributes somewhat, but that a rise in the mold temperature does not contribute.

Furthermore, in comparative examples 8-13 and working examples 11-12, which used coated paper as the paper label, adhesion wherein it could not be peeled could not be created in any of the conditions. This is conjectured to be because the fiber of the adhesion surface for the coated paper is not fuzzy, as in the manila paper and copy paper, and so it is difficult for the resin to enter into the fiber.

Note that in Table 1 and the following Tables 2 and 3, "Adhesion did not occur" means that neither pseudo adhesion adhered so as to be able to be peeled off, nor adhesion that cannot be peeled off occurred. Here, "adhered so as to be able to be peeled off" means an adhesion condition wherein the paper label can be peeled off without destroying it. Also, "adhesion that cannot be peeled off" means an adhesion condition wherein, when one tries to peel it off, the paper label is destroyed, and the adhered part is left on the base part 22 of the container body 20. Further, "to slightly adhere and not be able to be peeled" means an adhesion condition wherein, when one tries to peel it off, the paper label is destroyed, and a relatively small part of the adhered part is left on the base part 22 of the container body 20. In addition, "to strongly adhere and not be able to be peeled" means an adhesion condition wherein, when one tries to peel it off, the paper label is destroyed, and a relatively large part of the adhered part is left on the base part 22 of the container body 20.

Comparative Examples 14 and 15, Working Examples 13 and 14

With containers that used air as a pressurized medium for biaxial stretch blow shaping as comparative examples 14 and 15, the composite container 1 illustrated in FIG. 1 was manufactured under the same conditions as working examples 2-12 described previously besides those illustrated in Table 2. Comparative example 14 used manila paper as the paper label, and comparative example 15 used copy paper as the paper label, so the phenomena of the paper label being adhered to the container body was observed.

TABLE 2

| | PF Temp (° C.) | Peak Pressure (MPa) | Mold Temp (° C.) | Paper Label | Adhesiveness |
|---|---|---|---|---|---|
| Comparative Example 14 | 130 | 3.8 | 20 | Manila Paper | Had pseudo adhesion and was able to be peeled. |
| Comparative Example 15 | 130 | 3.8 | 20 | Copy Paper | Paper label slightly adhered and was not able to be peeled in the base part bottom end edge. |

In contrast to this, containers that used liquid (water) as a pressurized medium for biaxial stretch blow shaping were manufactured under the conditions illustrated in Table 3 as working examples 13 and 14. Note that besides the conditions illustrated in Table 3, the conditions were the same as the comparative examples 14 and 15. As a result, it was confirmed that under similar conditions, strong adhesion occurred when the pressurized medium was a liquid rather than when air was used.

TABLE 3

| | PF Temp (° C.) | Peak Pressure (MPa) | Mold Temp (° C.) | Paper Label | Adhesiveness |
|---|---|---|---|---|---|
| Working Example 13 | 120 | 3.8 | 20 | Manila Paper | Paper label strongly adhered and was not able to be peeled in the overlapping region of the paper tube and base part bottom end edge. |
| Working Example 14 | 120 | 3.8 | 20 | Copy Paper | Paper label strongly adhered and was not able to be peeled in the overlapping region of the paper tube, base part bottom end edge and base part top end edge. |

Note that the composite container in the present application is one that uses liquid as a pressurized medium for biaxial stretch blow shaping, but depending on the shaping conditions and materials, it is thought to be possible for a gas to be used in place of a liquid, or for a mixed fluid of liquid and gas to be used.

Further, in a case where separation of the paper label and container body is necessary, using coated paper as the paper label so that the paper label and container body do not adhere together is preferable.

What is claimed is:

1. A composite container combining a synthetic resin container body and a paper tube, wherein:
    the container body having a bottle shape including a tube-shaped base part having a bottom end edge rising up from an outer circumferential edge of a bottom part to a top end edge of the base part and connected to a mouth part via a shoulder part constricting in radius upwards;
    the paper tube being provided over an outer circumferential surface of the container body extending between the top end edge to the bottom end edge;
    at least a top end edge inner circumferential surface and a bottom end edge inner circumferential surface of the paper tube being adhered without adhesives to the outer circumferential surface of the base part of the container body, adherence of the paper tube to the container body being effectuated by disposing the paper tube in a mold and biaxial stretch blow shaping a preform into the container within the mold with a liquid as a pressurized medium; and
    wherein the paper tube is a curled up rectangular piece of paper having at least one protrusion formed on one end edge of the piece of paper in the circumferential direction and inserted into at least one slit formed on the other end edge of the piece of paper in the circumferential direction.

2. A composite container including a synthetic resin container body and a paper label, the composite container comprising:
    the container body having a bottle shape and including a mouth part, a tube-shaped base part having a bottom end edge rising up from an outer circumferential edge of a bottom part, the tube-shaped base part having a top end edge connected to the mouth part via a shoulder part constricting in radius upwards;
    the paper label forming a tube and being adhered without adhesive to an outer surface of at least one of the top end edge and the bottom end edge of the base part of the container body, adherence of the paper label to the base part being effectuated by disposing the paper label in a mold and biaxial stretch blow shaping a preform with a liquid as a pressurized medium into the container body; and
    wherein the paper label is a curled up rectangular piece of paper forming a tube and having at least one protrusion formed on one end edge of the piece of paper in the circumferential direction and inserted into at least one slit formed on the other end edge of the piece of paper in the circumferential direction.

* * * * *